United States Patent [19]
Darwood

[11] 3,991,274
[45] Nov. 9, 1976

[54] TELEPHONE ANSWERING SYSTEM WITH ONE RESPONSIVE CIRCUIT FOR REMOTE PLAYBACK CONTROL

[76] Inventor: James R. Darwood, 16250 Gundry Ave., Paramount, Calif. 90723

[22] Filed: Mar. 28, 1975

[21] Appl. No.: 562,975

[52] U.S. Cl. ............................................. 179/6 E
[51] Int. Cl.² ........................................ H04M 1/64
[58] Field of Search ........... 177/6 E, 100.1 DR, 2 A

[56] References Cited
UNITED STATES PATENTS

| | | | |
|---|---|---|---|
| 3,647,989 | 3/1972 | Mattar | 360/61 |
| 3,757,049 | 9/1973 | Bonsky et al. | 179/6 E |
| 3,867,578 | 2/1975 | Uechi | 179/6 E |
| 3,898,385 | 8/1975 | Shimomiti et al. | 179/6 E |
| 3,903,369 | 9/1975 | Darwood | 179/6 E |

Primary Examiner—Raymond F. Cardillo, Jr.

[57] ABSTRACT

A magnetic tape type of telephone answering system is provided which is capable of being operated from a remote point. A person may achieve remote control of the system by transmitting a tone of a predetermined frequency over the telephone line for a short time interval. In response to the tone, the telephone answering system automatically rewinds the message tape to its origin position, and then plays back all the accumulated messages recorded in the message tape and causes the recorded messages to be transitted to the calling party over the telephone line. The message tape is stopped after the transmission of the last message by the person sending the tone a second time over the telephone line, and the telephone answering system is thereby again set to its normal telephone answering operational mode.

3 Claims, 5 Drawing Figures

TELEPHONE ANSWERING SYSTEM WITH ONE RESPONSIVE CIRCUIT FOR REMOTE PLAYBACK CONTROL

The telephone answering system of the present invention is of the same general type as that described in copending application Ser. No. 460,921, filed Apr. 15, 1974, and which issued Sept. 2, 1975 as U.S. Pat. No. 3,903,369.

BACKGROUND OF THE INVENTION

The telephone answering system described in the copending application includes an announcement tape which is activated during an announcement interval ($T_1$) in response to a telephone call, and which causes a recorded announcement on the announcement tape to be transmitted over the telephone line to the calling party during that interval. At the end of the announcement interval ($T_1$), a message tape is activated, and it records the message from the calling party during an ensuing time interval ($T_2$). The telephone answering system may be constructed so that the time interval ($T_2$) may have a predetermined fixed time duration, or so that the time interval ($T_2$) may continue, within the limits of the system, for as long as the calling party is transmitting his message.

The telephone answering system described in the copending application enables the user of the system to call in from any part of the world, and to activate the system and cause it to transmit to the caller all the accumulated messages on the message tape. As fully described in U.S. Pat. No. 3,757,049, which issued Sept. 4, 1973, and which is assigned to the present assignee, remote control of the telephone answering system may be achieved by means of a small portable transmitter unit which is held up by the caller to the mouthpiece of a telephone, and which is pushbutton controlled to transmit a tone signal of a predetermined frequency over the telephone line. The telephone answering system is designed to respond to the particular tone frequency to activate a remote control circuit therein, so that the message tape may be rewound to its origin position, and then set to a playback condition so that the messages on the tape may be successively transmitted over the telephone line to the calling party.

The present invention provides a telephone answering system which incorporates a simple remote control circuit that responds to a tone signal of a particular frequency received over the telephone line. The control circuit of the invention, in response to the received tone signal, causes the message tape to return to its origin position, and then automatically sets the telephone answering system to its playback mode, so that the messages on the message tape may be transmitted in sequence to the calling party over the telephone line. The remote control circuit of the invention then responds to a second tone signal of the same frequency transmitted over the telephone line by the calling party to terminate the playback operation after the last message has been transmitted, and to reset the telephone answering system to its automatic answer operational mode.

DETAILED DESCRIPTION OF THE ILLUSTRATED EMBODIMENT

Figure 1:
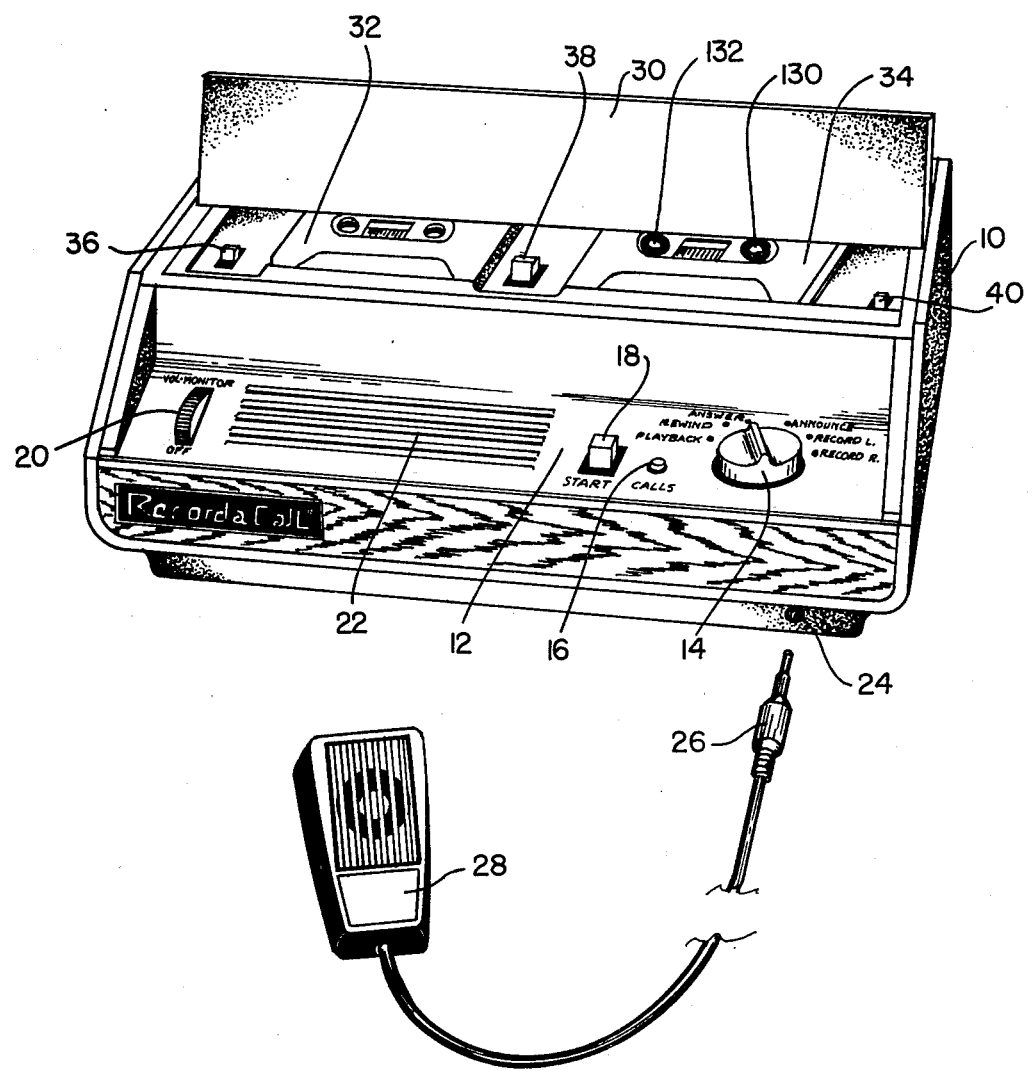
FIG. 1 is a perspective representation of a telephone answering instrument such as described in copending application Ser. No. 548,413, filed Feb. 10, 1975 and which may incorporate the improved system of the present invention.

The telephone answering instrument shown in FIG. 1 is of the type described in copending application Ser. No. 548,413, filed Feb. 10, 1975. It is constructed for direct use in conjunction with the telephone line, and it may be plugged into a usual telephone jack by an appropriate telephone connecting cord or cable. The instrument is energized from the usual domestic alternating current power source, and a typical power cord is also provided for plugging the unit into the domestic power receptacle.

The instrument shown in FIG. 1 includes a casing 10 having a control panel 12 extending along its forward edge. A control knob 14 is rotatably mounted on the control panel 12, and it controls a multi-section rotary switch. The rotary switch may be set to six different positions, indicated respectively as "Playback", "Rewind", "Answer", "Announce", "Record 1" and "Record 2".

A call light 16 is mounted on the control panel 12, and this call light is illuminated whenever a call is received by the instrument. A start button 18 is also mounted on the control panel 12 which, when depressed, operates a switch to place the instrument in operation, just as if a telephone call were received. Also, a combined on-off power switch and volume control 20 is mounted on the control panel 12. The instrument includes a speaker which is mounted behind a grill 22 on panel 12, and it also includes a microphone jack 24 which receives the plug 26 of a microphone 28.

The top of the casing 10 has a hinged lid 30 which may be opened to permit access to a pair of cassette-type tape units designated 32 and 34. The cassette tape unit 32 contains a loop of magnetic tape which bears the recorded announcement which is transmitted to the calling parties during the first time interval T-1 after each call is received, and which announcement may be changed from a remote source by the control circuit of the invention, as will be described. The cassette tape unit 34 contains a reel of magnetic tape which is drawn onto a take-up reel to record the messages from the calling parties which are received during each time interval T-2 following the corresponding announcement interval T-1.

A lever 36 is provided which permits the removal of the announcement cassette 32. An erase lever 38 is provided which, when operated during the rewind mode of the tape in the message cassette 34, serves to erase the previous message on the tape in the message cassette, as more fully described in copending application Ser. No. (K-1689). A fast forward lever 40 is also provided which imparts a fast forward motion to the tape in the message cassette 34, as also described in application (K-1689).

When the control knob 14 is turned to the "Answer" position, the telephone answering instrument is then set to answer incoming telephone calls automatically, and to transmit the announcement recorded on the magnetic announcement tape in cassette 32 to a calling party during the time interval T-1, and subsequently to record the message from the calling party on the message tape in cassette 34 during the following time interval T-2.

When the control knob 14 is turned to the Rewind position, the message tape in cassette 34 is driven in the reverse direction so that it may be rewound to its origin position. When the control knob 14 is turned to the Playback position, the message tape in the cassette 34 will move in the forward direction so that the messages previously recorded on the tape may be played and reproduced through the speaker mounted behind the grill 22.

Whenever a telephone call is received by the instrument, the call light 16 is illuminated, so that the operator may turn the control knob to Rewind and return the message tape to its origin position, and then he may turn knob 14 to the Playback position and play back the messages which have been received and recorded on the message tape. When the control knob 14 is turned to the Announce position, the telephone answering instrument will answer the telephone, and it will transmit the announcement on the announcement tape in cassette 32 to the calling parties. However, it will not record any incoming messages.

Any desired announcement may be recorded on the announcement tape in cassette 32 by turning the control knob 14 to the Record 1 position, by plugging the plug 26 into the microphone jack 24, and by speaking into the microphone 28. Likewise, the instrument may be used as a dictating machine, or for other recording purposes, by setting the control knob 14 to the Record 2 position, and by recording dictation, or other information on the message tape in cassette 34 through the microphone 28. This latter setting of the control knob 14 also permits the operator to record two-way conversations received over the telephone.

In the following discussion, the outgoing announcement tape will be referred to as the "T-1" tape. This tape is in the form of a loop contained in cassette 32 of FIG. 1. The loop contains a short piece of metal foil which comes in contact with the surfaces of switch CS1 in FIG. 2 as the announcement tape rotates, and provides an indication of the origin position of the announcement tape. The incoming message tape, which is contained in the cassette 34 of FIG. 1 will be referred to as the "T-2" tape, the cassette 34 being a standard cassette cartridge.

During the T-1 announcement mode during which the T-1 announcement tape is operating and transmitting the recorded announcement over the telephone line, a drive motor M-1 is energized, as is a control solenoid SD-1. When the solenoid SD-1 and motor M-1 are energized, the T-1 tape is caused to turn. After one complete loop during the operation of the T-1 tape, the metal foil will contact the switch CS1 to terminate the T-1 announcement mode. The system will be capable of entering the T-1 announcement mode when the control knob 14 is set to its Answer, Announce or Record 1 positions.

At the end of the T-1 announcement mode, the motor M-1 continues to operate, but the solenoid SD-1 is de-energized and the solenoid SD-2 is energized. This causes the T-1 announcement tape in cassette 32 to stop, and the T-2 message tape in cassette 34 to move in its "Forward" mode to record the incoming message. The system is capable of entering the T-2 operational mode when the knob 14 is set to its Playback, Answer, or Record 2 positions. When the control knob 14 is placed in the Rewind position, both solenoids SD-1 and SD-2 are de-energized, and a solenoid SD-3 is energized which serves to place the cassette 34 in a high speed rewind mode. This operation is discussed in detail in copending application (K-1689).

The power supply is composed of a power cord designated P-1 which is connected to the primary of a power transformer T-1. A pair of diodes D22 and D23 are connected to the secondary of the transformer, and a filter capacitor C38 is connected to the center tap of the secondary and to the cathodes of the two diodes. The capacitor C38 is a 2200 microfarad capacitor, and it constitutes the main filter capacitor for the power supply.

Figure 2A:
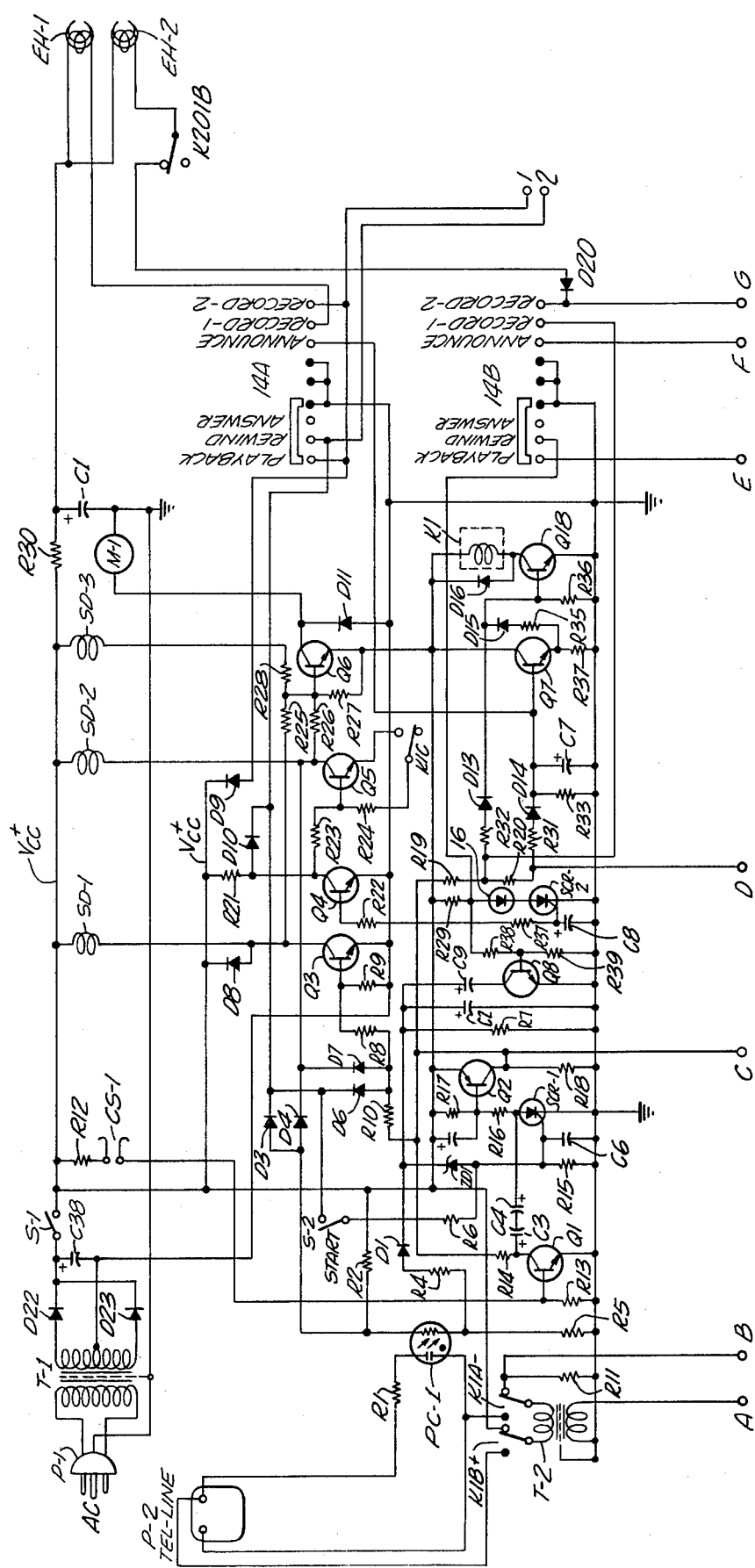
FIGS. 2A and 2B collectively represent a schematic diagram of the electronic portion of the telephone answering system which is mounted in the instrument of FIG. 1, and which is described in copending application Ser. No. 556,649, filed Mar. 10, 1975.

Direct current power is applied to the lead designated $V+_{cc}$ when a power switch S-1 is closed. The power line is connected through a 1.5 kilo-ohm resistor R30 and to a shunting filter capacitor C1 or 100 microfarads to supply ripple-free direct current to a pair of erase heads designated EH-1 and EH-2. The erase head EH-1 is magnetically coupled to the T-1 announcement tape in the cassette 32 of FIG. 1, and the erase head EH-2 is magnetically coupled to the T-2 message tape in the cassette 34. The power switch S-1 physically is part of the volume control 20 of FIG. 1. As shown in FIG. 2A, the solenoid SD-2 is shunted by a diode D8, and the solenoid SD-2 is shunted by a diode D9.

The usual telephone receptacle is designated P-2, and it connects to the three telephone leads, namely: tip (T), ring (R), and ring ground (RG). In normal configuration the ring ground (RG) is connected to the ring (R) lead. The (RG) lead is connected through a 150 kilo-ohm resistor R1 to a neon lamp in a module designated PC-1. The module PC-1 is a lamp-photoresistor module, which may be of the type presently marketed under the designation "Vatec VTL-3B48". The tip lead (T) is connected to the other terminal of the neon lamp. Resistor R1 insures that the ring detection circuit appears as a high impedance to the telephone line.

When a ring voltage is received over the telephone line, the neon lamp within the module PC-1 is illuminated, causing the photoresistor within the unit to decrease in resistance from approximately 5 megohms to 1 kilo-ohm. This photoresistor is connected through a pair of resistors R3 and R2 to the positive potential lead $V+_{cc}$. Each of these resistors may have a resistance, for example, of 560 ohms. The other terminal of the photoresistor in the module PC-1 is connected to a grounded resistor R5 which may, for example, have a resistance of 5.6 kilo-ohms. During idle conditions the voltage across the resistor R5 is approximately zero. During each ring cycle, however, this voltage increases to approximately 10 volts.

The junction between resistor R5 and the photoresistor in module PC-1 is also connected through an 8.2 kilo-ohm resistor R4 and through a diode D1 to a grounded capacitor C2 of, for example, 100 microfarads, and to a grounded resistor R7 of, for example, 470 kilo-ohms. Capacitor C2 is charged during each ring cycle by way of the resistor R4 and diode D1. When the voltage across the capacitor C2 reaches approximately 5 volts, which usually occurs after two ring cycles, a Zener diode ZD1 will conduct, triggering the gate of a silicon controlled rectifier SCR1. The gate of the silicon controlled rectifier is connected to a grounded 10 kilo-ohm resistor R15 which is shunted by a 4.7 microfarad capacitor C6. The firing of the silicon controlled rectifier SCR1, as will be described, initiates the announcement mode T-1, during which the recorded announcement is transmitted over the telephone line to the calling party. The capacitor C2 then discharges during the announcement mode T-1 through the resistor R7.

The circuit includes an NPN transistor Q8 having a grounded emitter, and whose collector is connected to a 47 microfarad capacitor C9 which, in turn, is connected to the capacitor C2. The base of the transistor Q8 is connected to a grounded 1 kilo-ohm resistor R39 and to a 4.7 kilo-ohm resistor R38. The transistor Q8, capacitor C9 and resistors R38 and R39 are used to obtain "automatic ring delay". On the first call after the unit has been turned on or reset, transistor Q8 is conductive, and this places capacitor C9 in parallel with capacitor C2, thus doubling the available ring delay to approximately four ring cycles. However, on all calls after the initial call, until reset, transistor Q8 is non-conductive, thus disabling the additional ring delay, and reducing the ring delay to approximately two ring cycles.

As described in the copending application Ser. No. 482,452, such a control sets the system so that the first call received after the system has been turned on requires a greater number of rings than subsequent calls. This means that the user can turn the system on while he is present, and so long as he answers his calls before the predetermined number of rings, the system will not answer or record the calls. However, if the user so desires, even when present, he can permit the predetermined number of rings to occur for an incoming call, so that the system will answer and record the call. Then, the system automatically sets itself so that for all subsequent calls, it requires a lesser number of rings.

The junction of the resistors R2 and R3 is connected through a diode D3 to the T-2 message tape reverse solenoid SD-3, and through a diode D4 to the message tape solenoid SD-1. These diodes perform interlock functions to assure that the ring detection circuit will not operate during the Playback, Rewind or Record 2 modes, during which time a ground is applied, as will be described to the corresponding terminals of either the solenoid SD-2 or SD-3.

When the proper number of rings have been received, either during the initial stage when both the capacitors C1 and C2 are in the ring detection circuit, or during subsequent calls when only the capacitor C1 is in the ring detection circuit, the silicon controlled rectifier SCR1 is fired to initiate the announcement mode T-1. The gate of the silicon controlled rectifier SCR1 is also connected to the start switch 18 through a 47 ohm resistor R6 so that the announcement mode can also be initiated by closing the start switch. The start switch is also connected to the interlock relay D3 to prevent the system from entering the announcement mode T-1 whenever it has been placed in any of the modes referred to in the preceding paragraph.

The base of the silicon controlled rectifier SCR1 is grounded, and the anode is connected through a pair of resistors R16 and R17 to the positive V+$_{cc}$ lead. The resistor R16 may have a resistance of 1 kilo-ohm, and the resistor R17 has a resistance of 330 ohms. The resistor R15 provides thermal stability for the silicon controlled rectifier SCR1, and the capacitor C6 insures that transients will not trigger the silicon controlled rectifier.

The junction of the resistor R16 and R17 is connected to a PNP transistor Q2. The base of the transistor Q2 is connected to the positive lead V+$_{cc}$, and the collector is connected to a grounded 560 ohm resistor R18. The emitter of the transistor Q2 is connected through a 4.7 kilo-ohm resistor R22 to the base of an NPN transistor Q4. The emitter of the transistor Q4 is grounded, and the collector is connected through a 470 ohm resistor R21 to the positive lead V+$_{cc}$. A capacitor C43 is connected to the emitter and base of transistor Q2. The resistor R17 provides thermal stability for the transistor Q2, and the capacitor C43 provides a short 200 millisecond delay in the rendering of the transistor Q2 conductive. The collector of the transistor Q2 is also connected to a PNP transistor Q3 through a 470 ohm resistor R10 and through a 540 ohm resistor R8. The junction of the resistors R10 and R8 is connected to the cathodes of diodes D3 and D4 through respective diodes D8 and D7. The base of the transistor Q3 is connected to a grounded 470 ohm resistor R9, its emitter is grounded, and its collector is connected to the solenoid SD-1.

When the transistor Q2 is rendered conductive, its collector voltage will approach the supply voltage V+$_{cc}$, and this will cause the transistor Q3 to become conductive by way of resistors R8 and R10. The resistor R9 provides thermal stability for the transistor Q3. When the transistor Q3 is rendered conductive, the solenoid SD-1 is energized, and the announcement tape is driven by the motor M-1.

The collector of the transistor Q3 is also connected to the base of PNP transistor Q6 through a 470 ohm resistor R25. The emitter of the transistor Q6 is connected to the positive lead V+$_{cc}$, and the base is connected to the emitter through a 330 ohm resistor R27. The collector of the transistor is connected to one terminal of the motor M-1, the other terminal of which is grounded. The motor is shunted by a diode D11. When the transistor Q3 is rendered conductive to energize the solenoid SD-1, the transistor Q6 is also rendered conductive by way of the resistor R25 to cause the motor M-1 to operate, and the T-1 announcement tape to begin to turn.

The switch CS1 is connected to a grounded 10 kilo-ohm resistor R13 and to a 1 kilo-ohm resistor R12. The latter resistor is connected to the positive terminal V+$_{cc}$. The resistor R13 is connected to the base of an NPN transistor Q1, whose emitter is grounded. The collector of the transistor Q1 is connected through a 470 kilo-ohm resistor R14 to the resistor R10. The collector is also connected to a 10 microfarad coupling capacitor C3 which, in turn, is connected to a 10 microfarad coupling capacitor C4. The latter capacitor is connected to the anode of the silicon controlled rectifier SCR1.

When the T-1 announcement tape turns to a point where its metal foil no longer contacts the switch CS1 which occurs in approximately half a second, the transistor Q1 is rendered non-conductive, and the capacitors C3 and C4 now begin to charge by way of the resistor R14. This charging time takes about five seconds. At the end of the T-1 announcement cycle, the metal foil on the T-1 announcement tape will again contact the switch CS1, which will cause the transistor Q1 quickly to be rendered conductive. When that occurs, the charged capacitors C3 and C4 drive the anode of the silicon controlled rectifiers SCR1 below ground potential, thus permitting the silicon controlled rectifier to be rendered non-conductive. When the silicon controlled rectifier SCR1 is rendered non-conductive, the transistor Q2 is rendered non-conductive, as is the transistor Q3, thereby causing the solenoid SD-1 to be de-energized, so as to stop the T-1 announcement tape.

When the transistor Q2 is rendered conductive at the beginning of the T-1 announcement mode, it also rendered the transistor Q4 conductive by way of the resistor R22. The transistor Q4 is connected to the base of the NPN transistor Q5 through a 560 ohm resistor R23, and through a diode D10 to the cathode of the interlock diode D3. The base of transistor Q5 is also connected to a 1 kilo-ohm grounded resistor R24. The collector of the transistor Q5 is connected to the solenoid SD-2, and through a 470 ohm resistor R26 to the transistor Q6. The emitter of the transistor Q5 is connected through a pair of normally open contacts K1C to ground, these contacts being closed during the T-1 announcement mode. The conductivity of the transistor Q4 during the T-1 announcement mode inhibits the operation of the transistor Q5, thus insuring that the solenoid SD-2 cannot be activated during the T-1 mode, so that there is no possibility of movement of the T-2 message tape during the announcement mode.

The collector of the transistor Q2 is also connected through a 470 ohm resistor R19, through a 2.2 kilo-ohm resistor R32, and through a diode D13 to the base of an NPN transistor Q18. The base of the transistor Q18 is connected to a grounded 4.7 kilo-ohm resistor R36, the emitter of the transistor is grounded, and its collector is connected to the coil of a relay K1, whose other terminal is connected to the positive lead V+$_{cc}$. The coil of the relay K1 is shunted by a diode D16.

During the T-1 announcement mode when the transistor Q2 is rendered conductive, the transistor Q18 is also rendered conductive to energize the relay K1. The diode D13, and a further diode D15 form a gate circuit, so that the transistor Q18 will be held conductive during the announcement mode when the transistor Q2 is conductive, or whenever the timer circuit of the transistor Q7 and capacitor C7 is charged and operating. The capacitor C7 has a capacity, for example, of 220 microfarads. It is connected to ground, and through a diode D14 to a 1 kilo-ohm resistor R31. The capacitor is also connected to a grounded 100 kilo-ohm resistor R33. The collector of the transistor Q7 is connected to the positive terminal V+$_{cc}$, and the emitter is connected to a grounded 4.7 kilo-ohm resistor R34. The emitter is also connected through a 4.7 kilo-ohm reistor R35 to the diode D15.

The junction of resistors R10 and R14 is connected through the resistor R19 to the resistor R32, and through a 330 ohm resistor R20 to the resistor R31. This connection causes the capacitor C7 to be charged during the T-1 announcement mode by way of the resistor R31 and diode D14. When the capacitor C7 is charged, the transistor Q7 is rendered conductive, and its emitter voltage is used to render the transistor Q18 conductive by way of the resistors R35 and diode D15, to energize the relay K1. The resistor R33 in conjunction with the capacitor C7 determines the length of time the relay K1 will remain energized after the termination of the announcement mode. The diode D16 connects across the coil of relay K1 suppresses transients and protects the transistor Q18.

Therefore, when the ring signal appears across the (RG) and (T) terminals, the module PC-1 is activated to render the transistor Q2 conductive, which, in turn, renders the transistors Q3 and Q6 conductive, as described above to energize the motor M-1 and the solenoid SD-1. The T-1 announcement tape now starts to move, so that the switch CS1 opens, and the transistor Q1 becomes non-conductive. The transistor Q8 then becomes conductive energizing the relay K1. When the relay K1 is energized, the relay contacts K1A and K1B close across the (T) and (R) terminals, connecting the transformer T2 to the telephone line. This permits the recorded announcement from the T-1 tape to be transmitted over the telephone line to the calling party.

At the end of the T-1 announcement interval, the system enters its T-2 message recording mode, during which the T-2 message tape is activated to record incoming messages. This occurs whenever a ground is placed on the lower terminal of the solenoid SD-2 which, at the same time, causes the transistor Q6 to become conductive to energize the motor M-1. As fully described in the Copending Application (K-1689) the motor M-1 drives both the T-1 announcement tape and the T-2 message tape capstans, and the individual tape drive mechanisms are selectively activated by energizing the solenoids SD-1 or SD-2. As mentioned above, for rewind of the message tape T-2, the solenoid SD-3 is energized.

The selector knob 14 of FIG. 1 controls four individual switch sections 14A, 14B, 14C and 14D. When the selector knob is placed in either the Playback or Record 2 position, the switch section 14A places a ground on the lower terminal of the solenoid SD-2 to cause the solenoid SD-2 and the motor M-1 to be energized, which is desired during the Playback and Record 2 operations.

The lower terminal of the solenoid SD-2 is also grounded by way of relay contacts K1C and transistor Q5. The transistor Q5 is normally held in its conductive state by way of base current from the resistors R21 and R23. The resistor R24 provides thermal stability for the transistor Q5. The conductivity of the transistor Q5 is inhibited during the T-1 announcement mode by the transistor Q4, as described above; and its conductivity is inhibited during the rewind mode by the diode D10, this being achieved when the switch section 14A is moved to the Rewind position (R) which places a ground on the cathode of the diode D10 thereby clamping the junction of the resistors R21 and R23 to 0.6-volts or less. This clamping voltage holds the base voltage of the transistor Q5 at a level below that necessary to cause the transistor to become conductive. Therefore, the circuitry described above assures that the solenoid SD-2 will be energized, together with the motor M-1, to move the T-2 message tape whenever the relay K1 is energized, except during the T-1 announcement mode or resind mode.

One side of the motor M-1 is grounded directly to the chassis to insure minimum brush noise being introduced into the audio circuits of the system. As described in the copending application (K-1689) the motor M-1 is driven in one direction, so that there is no need to switch its ground connection to the chassis. The diode D11 is a transient suppressor for the motor M-1, which protects the transistor Q6, as mentioned above. The transistor Q6 is in series with the motor M-1 to switch the positive power supply lead V+$_{cc}$ to the motor terminal. The resistor R27 provides thermal stability for the transistor Q6. The resistors R25, R26 and R28 form an "or" gate by which the transistor Q6 may be turned on during various operational modes, as described above. These resistors are connected to the ground terminals of the solenoids SD-1, SD-2 and SD-3, so that if any of these solenoids is energized, the motor M-1 will operate simultaneously.

The call light 16 is a light emitting diode in the circuit of FIG. 2A, and it is connected to the anode of a silicon controlled rectifier SCR2, and through a 560 ohm resistor R29 to the lead V+$_{cc}$. The cathode of the silicon controlled rectifier SCR2 is grounded, and its gate is connected to a 4.7 kilo-ohm resistor R37 and to a 47 microfarad capacitor C8. When the system is initially turned on, or is reset, the silicon controlled rectifier SCR2 is in its non-conductive state, and the indicator light 16 is extinguished. Upon the first operation of the T-1 announcement mode, representing the first call received over the telephone line, the silicon controlled rectifier SCR2 is triggered by way of the resistor R37, so that the call light 16 is illuminated to indicate to the user that a call has been received. The capacitor C8 is provided to prevent transient operation of the silicon controlled rectifier SCR2, and the resistor R29 provides a current limit for the call light 16. The call light is extinguished by either removing power by turning off the switch S-1, or by moving the switch section 14D to the Rewind position. Either of these operations places a ground short circuit on the positive side of the call light 16, thereby removing current from the silicon controlled rectifier SCR2 and allowing it to turn off.

The circuit of call light 16 also controls the automatic ring delay transistor Q8. When the call light 16 is extinguished, indicating that no calls have been received, the transistor Q8 is rendered conductive, so that both the capacitors C1 and C2 are placed in the ring delay circuit. When the call light 16 is illuminated, however, indicating that the first call has been received, the base voltage of the transistor Q8 becomes low, due to the voltage divider action of the resistors R38 and R39, so that the transistor becomes non-conductive, removing the capacitor C2 from the ring delay circuit.

The rewind operation for the message tape is effectuated, as described above, when the rewind solenoid SD-3 is energized, with the motor M-1 being energized in the same direction as for the T-1 and T-2 operating modes. This occurs when a ground is placed on the lower terminal of the solenoid coil SD-3, which is connected to the base of transistor Q6 through a 470 ohm resistor R28. A ground is placed on the lower terminal of the solenoid SD-3 when the switch section 14A is moved to the Rewind position. This also causes the transistor Q6 to become conductive so that the motor M-1 is simultaneously energized, and the T-2 message tape is driven in the reverse direction.

An audio pre-amplifier stage is provided, which is composed of the circuit of a pair of NPN transistors Q15 and Q16. The emitter of the transistor Q15 is grounded, and its collector is connected to a supply voltage lead V+ through a 33 kilo-ohm resistor R72 and through a 10 kilo-ohm resistor R74. The junction of resistors R72 and R74 is connected to a 100 microfarad grounded capacitor C20. The collector of transistor Q15 is connected to the base of transistor Q16. The collector of transistor Q16 is connected to resistor R74 through a 22 kilo-ohm resistor R73. The emitter of transistor Q16 is connected to a grounded 5.5. kilo-ohm resistor R77.

The base of transistor Q13 is connected to a 1 kilo-ohm resistor R78 which is coupled through a 10 microfarad coupling capacitor C23 to the common terminal of switch section 14D. The emitter of transistor Q16 is connected to a 223 microfarad capacitor C21 which, in turn, is connected to resistor R78 through a 15 kilo-ohm resistor R75. The capacitor C21 and resistor R75 are shunted by a 100 kilo-ohm resistor R76. The collector of transistor Q16 is connected to a 10 kilo-ohm resistor R79 which, in turn, is connected to a grounded 152 microfarad capacitor C22 and to a 103 microfarad capacitor C24.

The input signal to the audio pre-amplifier is selected by the switch section 14D, and it is fed to the base of the transistor Q15 by way of the coupling capacitor C23 and resistor R78. Supply voltage to the audio pre-amplifier is filtered by the resistor R74 and capacitor C20. The collector of transistor Q15 is directly coupled to the base of transistor Q16. The resistor R76 from the emitter of transistor Q16 to the base of transistor Q15 completes the direct current closed loop, providing a stable operating point. The resistor R75 and capacitor C21 form a negative feedback circuit which provides the correct audio shaping for playback from either the T-1 or T-2 tape. The resistor R77 provides direct current stability, as well as alternating current negative feedback, to stabilize the gain of the audio pre-amplifier. The resistor R79 and capacitor C22 at the output of the audio preamplifier provide a low-pass filter to prevent high frequency oscillation.

The microphone jack 24 is connected to the R1 and R2 terminals of switch section 14D through a 334 microfarad capacitor C37. This capacitor is connected in series with the input impedance of the amplifier during the R1 or R2 recordings by the microphone 28. The resistance/capacitance network formed by capacitor C37 and the input impedance of the pre-amplifier, which is approximately 1500 ohms, exactly complement the negative feedback provided by the resistor R75 and capacitor C21, so that the audio response of the pre-amplifier is flat when recordings are made by the microphone 28 during either the Record 1 or Record 2 operation.

The basic audio amplifier is composed of an integrated circuit IC-1, and its associated components. The coupling capacitor C24 is connected to pin 2 of the integrated circuit. Pin 1 is connected to a grounded 10 microfarad capacitor C26. Pins 3, 4 and 5 are grounded. Pin 6 is connected to a 103 microfarad capacitor C27 which, in turn, is connected to a grounded 222 micro-farad capacitor C25. Pin 7 is grounded, as are pins 10, 11 and 12. Pins 9 and 13 are open. Pin 14 is connected to the positive supply voltage lead V+. The output pin 8 of the integrated circuit IC-1 is connected through a coupling capacitor C30 of, for example, 10 microfarads to a grounded volume control potentiometer VR-1, the potentiometer being shunted by a 104 microfarad capacitor C32.

The output of the audio pre-amplifier is fed to input pin 2 of the audio amplifier intergrated circuit IC-1, and two further isolated inputs are provided to the circuit by way of pins 1 and 6. The audio amplifier pin 2 receives its input from a beep tone oscillator, formed by the circuit of a transistor Q13, by way of a 220 kilo-ohm resistor R81 and a 103 microfarad coupling capacitor C28. The audio amplifier input pin 2 also receives an input from the telephone line by way of a 4.7 kilo-ohm resistor R80 which is connected through a diode D17 to a 10 microfarad coupling capacitor C11 which, in turn, is connected to transformer T2. The resistor R80 and capacitor C25 also form a low-pass filter to prevent high frequency oscillation in the audio amplifier. The capacitor C26 provides improved low frequency response and hum reduction for the integrated circuit IC-1.

The filtered supply voltage V+ is fed to the integrated circuit IC-1 by way of pin 18, and the audio amplifier output is taken from pin 8 of IC-1 by way of capacitor C30. The output is fed through capacitor C30 to the telephone line by way of a 1.5 kilo-ohm resistor R51 which is connected to a 10 microfarad capacitor C14. The capacitor C14, in turn, is connected to the coupling capacitor C11 through diode D18. Accordingly, the diode D17 passes the incoming audio signals from the telephone line to the audio amplifier of integrated circuit IC-1 during the T-2 message recording mode, whereas the diode D18 feeds the output signals from the audio amplifier to the telephone line during the T-1 announcement mode.

The output from the audio amplifier of integrated circuit IC-1 is also fed through a 22 kilo-ohm resistor R88 to the common terminal of switch section 14C, so that it may be fed to the record/reproduce heads RPH-1, RPH-2, which are respectively associated with the T-1 announcement tape and T-2 message tape respectively, when the selector knob 14 is turned to the R-1 or R-2 positions.

Supply voltage for the entire audio section is utilized by use of a capacitor multiplier circuit associated with NPN transistor Q17, in conjunction with capacitor C31. The emitter of transistor Q17 is connected to the voltage lead V+. Its collector is directly connected to the lead V+$_{cc}$ and through a 560 ohm resistor R82 to its base. The emitter is connected through a grounded 10 microfarad capacitor C29. The base of the transistor Q17 is supplied with a filtered current through the circuit of resistor R82 and capacitor C31. The ripple current at the emitter output of the transistor Q17 is proportional to the degree of filtering provided at its base. The resistor R82 is connected through a 10 kilo-ohm resistor R86 and a 30 kilo-ohm resistor R87 to the common terminal of the switch section 14C, the junction between the resistors being connected to a grounded 22 microfarad capacitor C34.

The circuit includes a speaker designated SP, which is mounted behind the grill 22 of the unit of FIG. 1. An integrated circuit designated IC-2, and its associated components, constitute a further audio amplifier for the speaker. The movable arm of the volume control potentiometer VR-1 is connected through a 22 kilo-ohm resistor R83 to pin 6 of the integrated circuit IC-2. Pin 1 is connected to a grounded 4.7 microfarad capacitor C33, pin 2 is connected to a grounded 1 kilo-ohm resistor R84, pins 3, 4 and 5 are directly grounded, pin 6 is also connected to a grounded 1 kilo-ohm resistor R88, pins 7, 10, 11 and 12 are also grounded, pin 8 is connected to a coupling capacitor C36 having a capacitance of 220 microfarads, and which is connected to one terminal of the speaker SP, the other terminal of the speaker being grounded. The terminal 8 is connected to a grounded 224 microfarad capacitor C33, terminals 9 and 13 are open, and terminal 14 is connected to the power lead V+.

Both input pins 2 and 6 of the integrated circuit IC-2 are grounded through equal resistors R84 and R85 to insure that the direct current output from pin 8 will remain at approximately one-half the supply voltage. Input to the amplifier is taken from the volume control VR-1. The resistors R83 and R85 form a voltage divider which reduces the input to the amplifier to an appropriate level. The filtered supply voltage is fed to the ingrated circuit IC-2 by way of pin 14. The capacitor C35 is provided to eliminate high frequency oscillation. The capacitor C33, connected to pin 1, provides improved low frequency audio response and hum reduction. Pin 1 of the integrated circuit IC-2 is also connected to the collector of the transistor Q14, the circuit of which forms a speaker muting system to be described.

When the transistor Q14 is rendered non-conductive, the amplifier formed by the integrated circuit IC-2 operates normally. However, when the transistor Q14 is conductive, pin 1 of the integrated circuit IC-2 is short-circuited to ground, so that the operation of the integrated circuit IC-2 is paralyzed and the speaker is silenced. The emitter of the transistor Q14 is grounded, and its base is connected to the junction of a pair of 4.7 kilo-ohm resistors R70 and R71. The resistor R71 is grounded, and the resistor R70 is connected to contact A.O of the switch section 14B. The base of the transistor Q14 is connected to contact P of switch section 14B. The resistor R71 provides thermal stability for the transistor Q14.

The transistor Q14 is rendered non-conductive, so as to permit operation of the speaker SP, only when the system is in the playback mode, in the T-2 message mode, or in the announce-only mode. In the playback mode, the base of the transistor Q14 is short-circuited directly to ground by the switch section 14B in its illustrated position, so that transistor Q14 is non-conductive. In the T-2 message recording mode, the transistor Q14 is also non-conductive because its drive is removed from both inputs to the or gate formed by resistor R70, and by a 3.3 kilo-ohm resistor R42. In the announce-only mode, the switch section 14B is shifted to the A.O contact, which short-circuits the junction of resistors R66 and R70 to ground, rendering the transistor Q14 non-conductive, so as to permit speaker operation during the announce-only mode.

Therefore, as described above, muting is removed from the speaker circuit during the playback mode, so that the messages previously recorded on the message tape T-2 may be reproduced. Muting is also removed during the incoming message mode, so that the incoming messages may be monitored, if so desired; and in the announce-only mode, during which the speaker may be operated during the T-1 announcement interval for monitoring purposes, but is muted during the stand-by condition.

Otherwise, during the T-1 mode the speaker is muted, since the resistor R70 receives its input by way of a 4.7 kilo-ohm resistor R66 which is connected through the resistors R20, R19 and R14 to the collector of transistor Q1, which is at a relatively high voltage during the T-1 mode, when the switch CS1 is opened; and resistor R42 receives its input by way of relay contact K1A, which is connected through the winding of transformer T2, and the contacts K1B to the high voltage lead V+$_{cc}$ when the relay K1 is de-energized.

The audio switching circuit is composed of the diode D17 and D18, and associated control circuitry. The diode D18 is effective to permit the passage of audio intelligence from the output of the audio amplifier integrated circuit IC-1 to the telephone line; whereas the diode D17 is effective to permit the incoming messages from the telephone line to be fed to the audio amplifier integrated circuit IC-1 for amplification.

The audio switching control circuit includes an NPN transistor Q9 whose emitter is grounded, and whose collector is connected to a grounded 4.7 kilo-ohm resistor R44 and through a 3.3 kilo-ohm resistor R41 to the relay contacts K1A. The collector of transistor Q9 is also connected to the junction of resistors R50 and R74 through a 1 kilo-ohm resistor R46, and to a grounded 10 microfarad capacitor C12. The relay contacts K1A are also connected to a grounded 3.3 kilo-ohm resistor R11. The base of transistor Q9 is connected to resistor R20 through a 6.8 kilo-ohm resistor R52. The collector of the transistor Q9 is also connected to an 820 ohm resistor R45 which, in turn, is connected to the junction of capacitor C11 and the diodes D17 and D18. This junction is also connected to a 6.9 kilo-ohm resistor R43. The cathode of the diode D17 is connected through a 1.5 kilo-ohm resistor R47 and through a 1.5 kilo-ohm resistor R50 to the voltage lead V+. The junction of these two resistors is connected to the junction of a grounded 1.8 kilo-ohm resistor R49 and 3.3 kilo-ohm resistor R48. The resistor R49 is shunted by a 100 microfarad capacitor C13, and the resistor R48 is connected to the anode of the diode D18.

As mentioned above, during the T-1 announcement interval, the audio announcement on the T-1 tape, as amplified by the audio amplifier IC-1 is fed from the output of the amplifier to the telephone line through the diode D18. On the other hand, during the T-2 message recording mode, the message from the calling party is fed from the telephone line to the input of the audio amplifier integrated circuit IC-1 by way of the diode D17. The resistors R50 and R49 form a voltage divider network which supplies a voltage approximately midway between ground and the supply voltage V+ to the diodes D17 and D18. Capacitor C13 filters this voltage and provides a very low alternating current impedance feedback around the integrated circuit IC-1 by way of the resistors R47 and R48. The cathode of the diode D17 and the anode of the diode D18 are biased by the divided V+ voltage by way of the resistors R47 and R48 respectively. The anode of the diode D17 and the cathode of the diode D18 are both connected to the telephone line through the capacitor C11 and transformer T2.

When the transistor Q9 is non-conductive, filtered voltage is fed by way of the resistors R46 and R45 to the junction of the two diodes D17 and D18. When the transistor Q9 is non-conductive, the filtered voltage V+ is fed to the junction of the diodes D17 and D18 by way of the resistors R46 and R45. This voltage causes the diode D17 to be forward biased to its conductive state, and the diode D18 to be reversed biased to its non-conductive state, thus allowing the audio signals to be fed only from the telephone line to the input of the audio amplifier IC-1. This condition obtains during the T-2 message recording mode.

On the other hand, when the transistor Q9 is rendered conductive, the junction of the diodes D17 and D18 is short-circuited to ground by way of the resistor R45 and transistor Q9. This latter action causes the diode D18 to be forward biased to its conductive state, and the diode D17 to be reversed biased to its non-conductive state, thus allowing the audio signals to be fed only from the output of the audio amplifier integrated circuit IC-1 to the telephone line. The latter condition obtains during the T-1 announcement mode.

The capacitor C12 provides a very low alternating current impedance, such that the secondary of the transformer T2 always sees a constant 820 ohms (resistor R45) in parallel with the other resistance in the circuit. Resistor R44 provides thermal stability for the transistor Q9. The transistor Q9 receives its base drive from an or gate formed by the resistors R41 and R52. The resistor R41 receives its input by way of relay contacts K1A, transformer T2, and relay contacts K1B, when the relay K1 is de-energized. The resistor R52, on the other hand, receives its input from the collector of the transistor Q1 during the T-1 announcement interval.

In this way, the transistor Q9 is rendered non-conductive only when the relay K1 is energized; but there is no voltage at the collector of the transistor Q1, which occurs only during the incoming message record mode T-2. In all other modes, the audio switching network of transistor Q9 is held in the "outgoing" position to assure that no unwanted audio signals from the telephone line will enter the audio amplifier.

The circuit of the NPN transistor Q13 forms the "beep" oscillator such as described in Copending Application Ser. No. 482,452. The collector of the oscillator is connected through a 3.3 kilo-ohm resistor R65 and 1 kilo-ohm resistor R64 to the positive power lead V+$_{cc}$. The collector is also connected to the base through a pair of 47 kilo-ohm resistors R67 and R68. The emitter of the transistor Q13 is connected through a diode D19 to the collector of transistor Q9. The resistors R67 and R68 are shunted by a pair of 222 microfarad capacitors C17 and C18. The junction of the resistors R67 and R68 is connected to a 103 microfarad grounded capacitor C19, and the junction of the capacitors C17 and C18 is connected to a grounded 10 kilo-ohm resistor R69. The junction of resistors R67 and R65 is connected to a grounded 33 microfarad capacitor C16. The resistors R67, R68 and R69, together with the capacitors C17, C18 and C19 form a "bridged tee" feedback network which provides positive feedback at only one frequency from the collector to the base of the transistor Q13. With the aforesaid described parameters, this frequency is of the order of 1200 cycles.

The resistor R64 and capacitor C16 form a supply filter so that no ripple is present at the oscillator during the idle conditions. The resistor R65 is the collector load for the oscillator. The output is taken from the collector of the transistor Q13 and is fed by way of a 103 microfarad capacitor C28 and resistor R81 to the input of the audio amplifier integrated circuit IC-1. The output of the oscillator is amplified by the audio amplifier and fed to the telephone line at the conclusion of the T-1 announcement mode, and continues for a preset time of approximately one-half second. This is accomplished by using a Schmitt trigger circuit formed by a pair of transistors Q10 and Q11, and a timer circuit composed of a 47 microfarad capacitor C15 and a 58 kilo-ohm resistor R55.

The capacitor and resistor are both grounded, and connected to the junction of a pair of 10 kilo-ohm resistors R53 and R54. The resistor R54 is connected to the base of the transistor Q10, and the resistor R53 is connected to the junction of resistors R52 and R66. The emitter of the transistor Q10 is connected to the emitter of the transistor Q11, and to a common 56 ohm grounded resistor R58. The collectors of the transistors Q10 and Q11 are connected to the positive lead $V+_{cc}$ through resistors R56 and R61. The resistor R56 has a resistance of 1.5 kilo-ohms, and the resistor R61 has a resistance of 3.3. kilo-ohms. The collector of the transistor Q10 is connected to the base of transistor Q11 through a 4.7 kilo-ohm resistor R57, and the base of the latter transistor is connected to the emitters through a 4.7 kilo-ohm resistor R60. The junction of resistors R57 and R60 is connected to the junction of resistors R52 and R66 through a 4.7 kilo-ohm resistor R59. The collector of the transistor Q11 is connected through a 3.3 kilo-ohm resistor R62 to the base of a grounded emitter NPN transistor Q12. The base of the latter transistor is connected to a grounded 1 kilo-ohm resistor R63, and is collector is connected to the emitter of transistor Q13.

During the T-1 announcement mode, when the switch CS1 is open, a high voltage appears at the junction of resistor R53 and resistor R20, and the capacitor C15 is charged to render the transistor Q10 conductive. Transistor Q11 would normally be rendered non-conductive by this action, however, it continues to receive a base drive voltage by way of resistor R59 from the junction of resistors R20 and R33. Therefore, the transistor Q11 remains conductive for the duration of the announcement interval, and until the completion of the announcement interval when the switch CS1 closes to remove the voltage from the resistor R59. When that occurs, the transistor Q11 is immediately rendered non-conductive, thereby supplying a base drive voltage to the transistor Q12 by way of the resistors R61 and R62, so that the transistor Q12 is rendered conductive. When the transistor Q12 is conductive, it short-circuits the emitter of transistor Q13 to ground, allowing the beep tone oscillator to operate.

The diode D19 also provides a path from the collector of the transistor Q12 to the collector of the transistor Q9 to assure that the audio switching network will be held in the outgoing mode for the duration of the beep tone, so that the tone will be transmitted over the telephone line and heard by the calling party. When the charge on the capacitor C15 diminishes sufficiently, the transistor Q10 will be rendered non-conductive, thereby rendering the transistor Q11 conductive which, in turn, renders the transistor Q11 non-conductive and terminates the generation of the beep tone. The resistor R63 provides thermal stability for the transistor Q12.

Signals to be recorded on the T-2 tape and T-1 tape are fed to the switch section 14C from the output of the audio amplifier integrated circuit IC-1, and specifically to the common contacts of the switch section 14C. The switch section 14C selects the appropriate head RPH-1 or RPH-2 to which the recording signals will be fed for a given mode. In the playback, rewind, and announce-only modes, no recording is required, so that the output from the audio amplifier integrated circuit IC-1 is short-circuited to ground for the P, R and A.O positions of the switch section 14C. In the Answer (A) and Record 2 (R-2) positions of switch section 14C, the recording signals from the audio amplifier integrated circuit IC-1 are fed to the record/playback head RPH-2. In the Record 1 (R-1) position of switch section 14C, the output signals from the audio amplifier integrated circuit IC-1 are fed to the record/playback head RPH-1.

The output signals for heads RPH-1, RPH-2 are taken from pin 8 of the integrated circuit IC-1 by way of the resistor R88. The resistance of resistor R88 and the impedance of the selected head reduce the audio signals to the required level. Direct current bias is received by way of the resistor R87. Bias current is taken from the base of the transistor Q17, and is further filtered by the resistor R86 and capacitor C34. The control of the signals to the heads RPH-2 and RPH-1 is effectuated through relay contacts K201A and K301A respectively which are operated by a remote control circuit, as will be described. During normal operation, the signals pass to the record/playback head through normally closed contacts K201A and K301A respectively.

The erase heads EH-1 and EH-2, which are respectively associated with the T-1 tape and T-2 tape are controlled by the switch sections 14A and 14B and remote control relay contacts K201B. Supply voltage for the erase heads is provided by the resistor R30 from the $V+_{cc}$ line, and is filtered by the capacitor C1. Operation of the appropriate erase head is achieved by connecting the other terminal of the selected head to ground. Operation of the erase head EH-1 is required only during the Record 1 (R-1) mode, and for this mode, the terminal of the head EH-1 is grounded by way of the switch section 14A. Operation of the erase head EH-2 is required during the answer and Record 2 modes, and this action is achieved by the switch section 14B directly during the answer mode, and by way of diode D20 in the Record 2 (R-2) recording mode.

The Playback and Record 2 contacts of switch section 14A are connected to an output terminal 1; the Rewind contact of switch 14A is connected to an output terminal 2; the winding of transformer T2 is connected to an output terminal 3, and supplies audio signals from the telephone line to that terminal when the relay K1 is energized; the collector of transistor Q2 is connected to an output terminal 4. The output terminals, 1, 2, 3 and 4 are connected to a T-2 remote control circuit of FIG. 3.

Figure 3A:
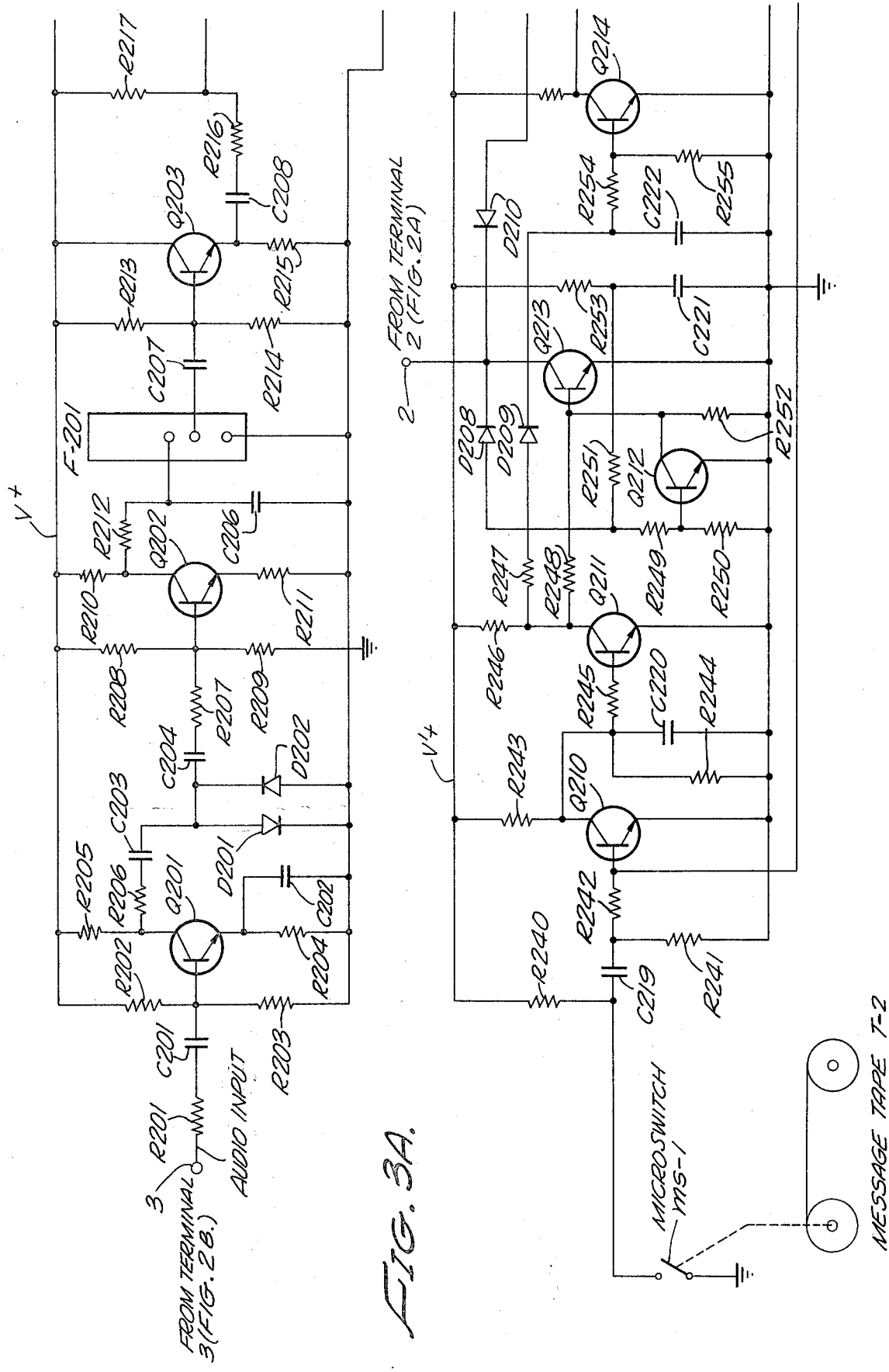
FIGS. 3A and 3B collectively represent a circuit diagram of a T-2 remote control system representing one embodiment of the invention, and which may be used in conjunction with the system of FIGS. 2A and 2B.
Figure 3B:
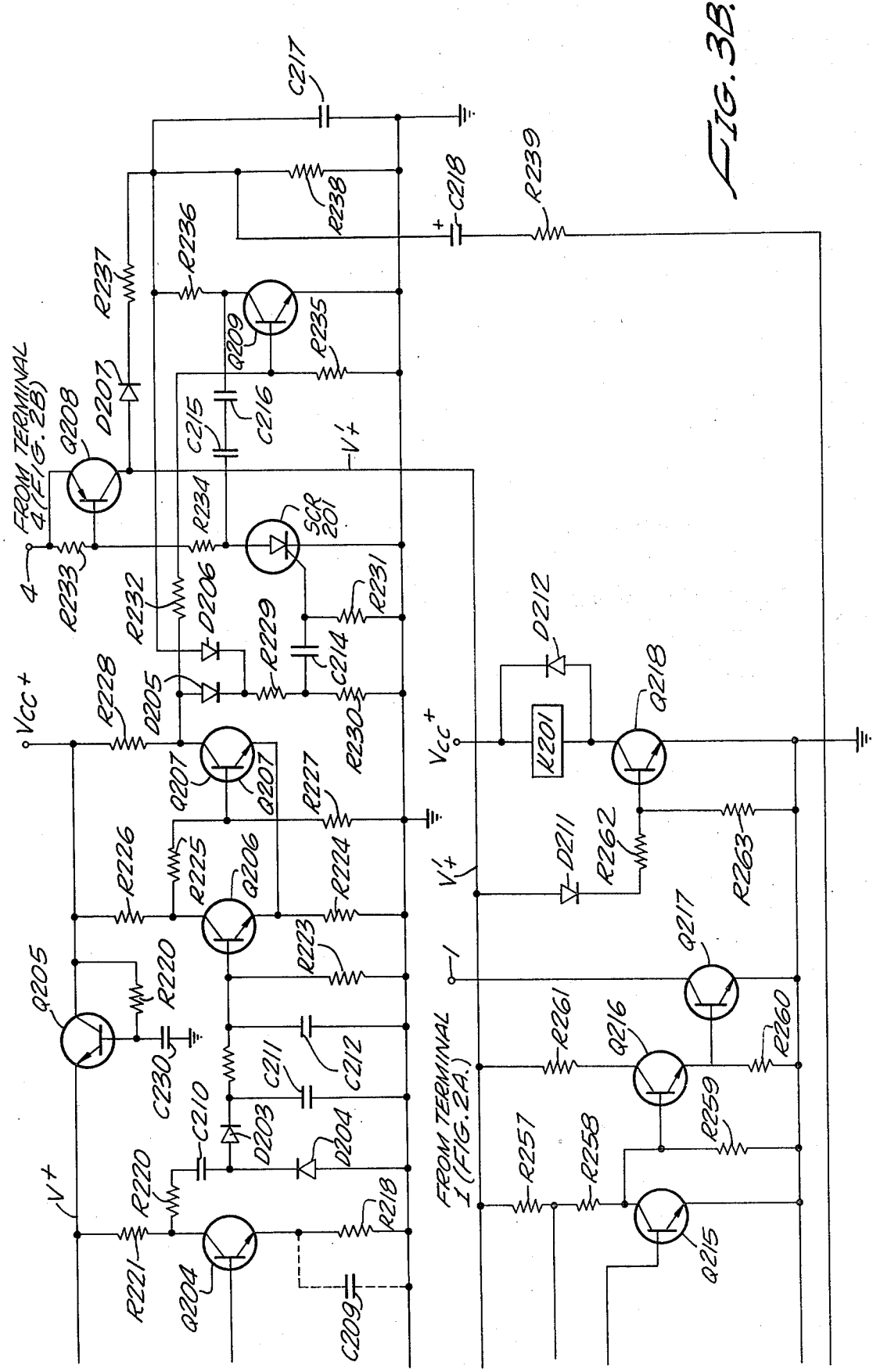

By use of the remote control circuit of FIGS. 3A and 3B, a person may achieve remote control of the T-2 tape of the system by transmitting a tone of a predetermined frequency over the telephone line for a short time interval. In response to the tone, the T-2 control circuit of FIGS. 3A and 3B causes the message tape T-2 to rewind to its origin position, and it then causes the message tape to play back all the accumulated messages recorded on the tape, and causes the messages to be transmitted to the calling party over the telephone line. The message tape is stopped after the transmission of the last message by the person sending the tone a second time over the telephone system, and the telephone answering system is thereby again set to its normal telephone answering operational mode.

The remote control circuit of FIGS. 3A and 3B enables the user of the system to call in from any part of the world, and to activate the system and cause it to transmit to the caller all the accumulated messages on the T-2 message tape. As fully described in U.S. Pat. No. 3,757,049 which issued Sept. 4, 1973, and which is assigned to the present Assignee, remote control of the telephone answering system may be achieved by means of a small portable transmitter unit which is held up to the mouthpiece of a telephone by the caller, and which is pushbutton controlled to transmit a tone signal of a predetermined frequency over the telephone line. The control circuit of FIGS. 3A and 3B is constructed to respond to the particular tone frequency to control the T-2 message tape, as will be described, so that the message tape may be rewound to its origin position, and then reset to a playback condition so that the messages on the T-2 message tape may be successively transmitted over the telephone line to the calling party.

The T-2 remote control circuit includes a microswitch MS-1 (FIG. 3A) which is eccentrically connected to the feed spindle of the T-2 message tape drive mechanism. One side of the switch MS-1 is grounded, and, as long as the T-2 message tape is being driven, the switch MS-1 will alternately make and break its ground connection providing a pulse train at the input of the NPN transistor Q10. The T-2 remoted control circuit is operational only during the T-1 announcement mode, and it requires that the tone from the calling party be transmitted during that mode. When the proper tone signal is received, the T-1 announcement tape will stop, the T-1 mode will immediately terminate, and the T-2 message tape will go into a rewind condition. When the T-2 message tape is completely rewound, it will automatically begin its playback mode so that all the messages recorded on the T-2 tape may be transmitted in sequence over the telephone line to the calling party. Upon a second application of the same remote tone signal from the calling party to the telephone line, the remote operation will be terminated, and the T-1 announcement tape will again begin turning from the point at which it was stopped by the first transmission of the remote tone signal to the completion of the T-1 announcement mode. The system will then revert to its original automatic answer mode in readiness for the next telephone call.

Figure 2B:
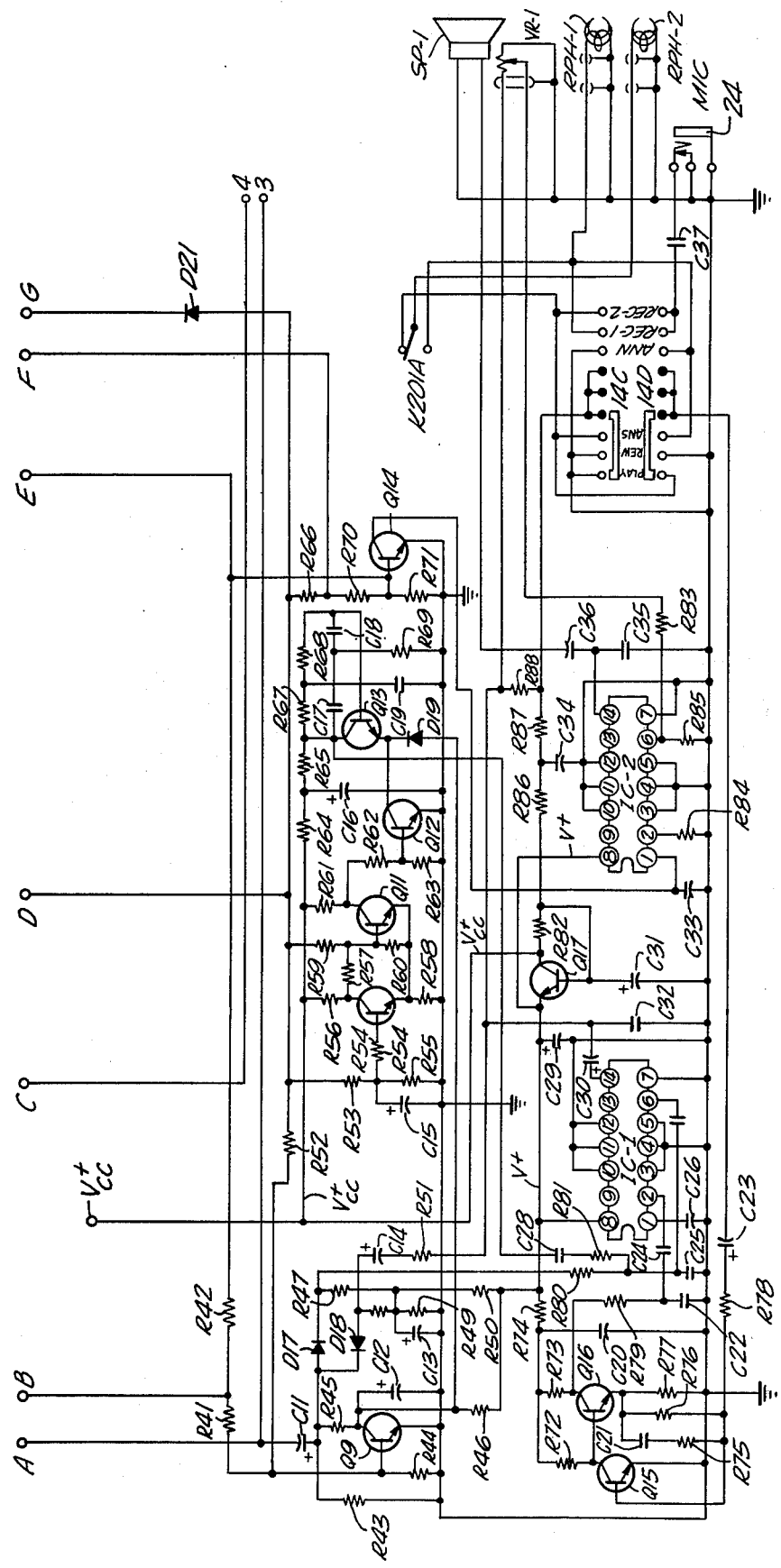

Audio input for the T-2 remote control circuit of FIG. 3A is taken directly from the secondary winding of the transformer T2, and is applied from output terminal 3 of FIG. 2B to the input terminal 3 of FIG. 3A. The latter input terminal is connected through a 1 kilo-ohm resistor R201 and through a 10 microfarad capacitor C201 to the base of an NPN transistor Q201. The base is connected to the voltage lead V+ through a 56 kilo-ohm resistor R202 and to ground through a 22 kilo-ohm resistor $203. The emitter is connected to a grounded 1 kilo-ohm resistor R204 which is shunted by a 40 microfarad capacitor C202. The collector is connected to the V+ lead through a 3.3 kilo-ohm resistor R205, and is also connected to a 1 kilo-ohm resistor R206.

The resistor R206 is connected to a 10 microfarad capacitor C203 which, in turn, is connected to the anode of a diode D201, to the cathode of a diode D202 and to a 10 microfarad capacitor C204. The cathode of diode D201, and the anode of diode D202 are grounded. The capacitor C204 is connected through a 1 kilo-ohm resistor R207 to the base of a transistor Q202. The base of transistor Q202 is connected through a 150 kilo-ohm resistor R208 to the V+ lead, and the base is also connected to a grounded 10 kilo-ohm resistor R205. The emitter of transistor Q202 is connected to a 100 ohm grounded resistor R211, and its collector is connected to a 3.3 kilo-ohm resistor R210 and to a 1 kilo-ohm resistor R212. The resistor R210 is connected to the positive lead V+, whereas the resistor R212 is connected to a filter circuit F201 and to a grounded 0.0047 microfarad capacitor C206. A further terminal of filter circuit F201 is grounded, and its output terminal is connected to a 10 microfarad coupling capacitor C207.

The audio input applied to input terminal 3 of the T-2 remote circuit of FIG. 3A, and which is taken directly from the secondary of transformer T2 in FIG. 2B, is fed by way of resistor R201 and capacitor C201 to the base of the transistor Q201, which functions as an audio pre-amplifier. The output of the audio preamplifier is fed to a clipper circuit formed by the diodes D201 and D202, and the output from the clipper circuit is fed to the input of the circuit of transistor Q202 which functions as an audio amplifier. At this point the audio signal is a square wave of approximately 1-volt amplitude. The output of the audio amplifier circuit of transistor Q202 is fed to the input of filter F201. The filter F201 is a narrow bandpass filter of any appropriate design which selects the T-2 control tone from the incoming audio. The T-2 tone output of the filter F201 is fed to an emitter follower circuit formed by a transistor Q203 which serves as an isolation stage, and whose output is fed to a rectifier driver circuit of transistor Q204.

The base of transistor Q203 is connected to a 1 meg-ohm grounded resistor R214 and through a 220 kilo-ohm resistor R213 to the V+ lead. The collector of transistor Q203 is directly connected to the V+ lead, and the emitter is connected to a grounded 10 kilo-ohm resistor R215. The emitter is also connected to a 10 microfarad capacitor C208 which is connected through a 1 kilo-ohm resistor R216 to the base of transistor Q204. The base is also connected to the V+ lead through a 150 kilo-ohm resistor R217. The emitter of transistor Q204 is connected to a grounded 470 ohm resistor R218 which may be shunted by a 40 microfarad capacitor C209. the collector of transistor Q204 is connected through a 3.3 kilo-ohm resistor R221 to the V+ lead, and also to a 1 kilo-ohm resistor R220. The resistor R220 is connected through a 10 microfarad capacitor C210 to the anode of a diode D203 and to the cathode of a diode D204. The anode of diode D204 is grounded, and the cathode of diode D203 is connected to a grounded 1 microfarad capacitor C211 and to a 15 kilo-ohm resistor R222. The resistor R222 is connected to the base of an NPN transistor Q206, and to a grounded 40 microfarad capacitor C212. The base is also connected to a grounded 47 kilo-ohm resistor R223. The collector of the transistor Q206 is connected through a 3.3 kilo-ohm resistor R226 to the positive potential lead V+$_{cc}$.

A transistor Q205 has its collector connected to the lead V+$_{cc}$, and it serves the same function as the transistor Q17 in the circuit of FIG. 2B further to filter the voltage on the lead V+$_{cc}$ to provide a highly filtered DC voltage for the lead V+. The base of the transistor Q205 is connected to a 220 microfarad capacitor C230, and the base is connected to the collector through a 470 ohm resistor R270.

The output of the rectifier driver circuit of transistor Q204 is fed to the diodes D203 and D204 which rectify the audio signal. This rectified voltage is used to charge the capacitor C212 by way of resistor R222, the time constant being approximately one-half a second. When capacitor C212 has been charged sufficiently, to approximately 1 volt, for example, a Schmitt trigger formed by the circuit of transistors Q206 and Q207 will flip to its unstable condition in which the transistor Q206 is rendered conductive, and the transistor Q207 is rendered non-conductive. The collector of transistor Q207 is connected to the positive terminal V+$_{cc}$ through a 3.3 kilo-ohm resistor R228, the collector of transistor Q206 is connected to the base of transistor Q207 through a 4.7 kilo-ohm resistor R225, the base of transistor Q207 is connected to a grounded 4.7 kilo-ohm resistor R227, and the emitters of transistors Q206 and Q207 are connected to a common grounded 100 ohm resistor R224.

The Schmitt trigger remains in its unstable condition for a short time interval, and then returns to its stable condition. During the short time interval in which the Schmitt trigger is triggered to its unstable condition, a positive-going pulse appears at the collector of the transistor Q207, which is used to trigger a silicon controlled rectifier SCR201 by way of the diode D205, through a 4.3 kilo-ohm resistor R229, and through a 33 microfarad capacitor C214, the capacitor being connected to the gate of the silicon controlled rectifier SCR201. The resistor R229 is also connected to a grounded 100 kilo-ohm resistor R230, and the gate of the silicon controlled rectifier SCR201 is connected to a grounded 1 kilo-ohm resistor R231. The cathode of the silicon controlled rectifier SCR201 is grounded, and the anode is connected to terminal 4 of the circuit of FIG. 2B through a 1 kilo-ohm resistor R234 and through a 330 ohm resistor R233. Terminal 4 of the circuit of FIG. 2B is connected to the collector of transistor Q2 and through resistor R14 to the collector of transistor Q1. The terminal 4 of FIG. 2B is connected back to the collector of the transistor Q1 so that a relatively high voltage appears at terminal 4 during the T-1 announcement mode when the switch CS1 is open. Thus, the silicon controlled rectifier SCR201 can be fired only during the T-1 announcement mode.

The common junction of the resistors R233 and R234 is connected to the base of a PNP transistor Q208. The emitter of transistor Q208 is connected to the terminal 4, and its collector is connected to a diode D207 which, in turn, is connected to a 1 kilo-ohm resistor R237. The resistor R237 is connected to a grounded 6.7 microfarad capacitor C217, and to a grounded 10 kilo-ohm resistor R238. The anode of the silicon controlled rectifier SCR201 is coupled through a pair of 10 microfarad coupling capacitors C215 and C216 to the collector of an NPN transistor Q209. The collector of transistor Q209 is also connected through a 47 kilo-ohm resistor R236 to the junction of resistors R237 and R238. The resistor R236 is also connected to a diode D206 which, in turn, is connected to the resistor R229. The resistor R229 is also connected to a diode D205 which, in turn, is connected to the collector of transistor Q207 and to a 4.78 ohm resistor R232. The resistor R232 is connected to the base of transistor Q209 and to a grounded 1 kilo-ohm resistor R235.

When the tone signal of proper frequency is received and passed by filter F201, the Schmitt trigger Q206, Q207 is triggered, so that a positive pulse appears at the collector of the transistor Q207. This positive pulse is applied to the gate of the silicon controlled rectifier SCR201 through the diode D205, through the resistor R229, and through the capacitor C214. If the proper tone is received during the T-1 announcement interval, the switch CS1 of FIG. 1 will be open, so that a positive voltage will appear at terminal 4, and this voltage will be introduced through the resistors R233 and R234 to the anode of the silicon controlled rectifier SCR201, Therefore, if the proper T-2 tone is received during the T-1 announcement interval, the receipt of the tone will cause the SCR201 to be triggered to a conductive state.

When the silicon controlled rectifier is in its conductive state, the transistor Q208 will also be conductive due to the base current received by way of the resistor R234. The collector voltage of the transistor Q208 will then approximate the T-1 supply voltage which is applied to terminal 4 during the T-1 announcement mode, and this voltage is introduced through diode D207 and resistor R237 to capacitor C217, the latter elements forming a filter to remove any ripple from the supply voltage. The T-1 supply voltage is also applied through the diode D206 to hold the capacitor C214 in its charged condition, and to hold the silicon controlled rectifier SCR201 in its conductive state, even though the tone signal has been terminated, and the Schmitt trigger of transistors Q206 and Q207 has returned to its stable condition.

The T-1 supply voltage at the collector of transistor Q208 is also used to charge the capacitors C215 and C216 by way of the resistor R236. At this time, the transistor Q209 is non-conductive since the Schmitt trigger circuit of transistors Q206, Q207 has returned to its stable condition, so that the transistor Q207 is conductive, and its collector voltage at a relatively low level. As will be described, the T-1 tape now stops with switch SC1 remaining open, and the T-2 tape is rewound to its origin position. Then the system automatically enters its playback mode and the messages recorded on the T-2 tape are sent in sequence over the telephone line to the calling party.

Upon the next receipt of the T-2 tone signal from the calling party, after the message tape T-2 has played back the recorded messages to the calling party, the Schmitt trigger circuit of transistors Q206, Q207 is again triggered, so that again the collector voltage of the transistor Q207 goes high, and this causes the transistor Q209 to become conductive by way of the resistor R232. When the transistor Q209 is rendered conductive, the charged capacitors C215 and C216 will be short-circuited to ground, driving the anode of the silicon controlled rectifier SCR201 below ground potential, and causing the silicon controlled rectifier to become non-conductive.

During the above-mentioned remote controlled T-2 rewind operation, the microswitch MS-1 is operated and introduces a series of pulses to transistor Q210 through a coupling capacitor C219 of 16 microfarads and through a 2.2 kilo-ohm resistor R242. The collector of the transistor Q208 is also connected to a lead designated V'+, and it produces a voltage on lead V'+ which exists only during the T-1 mode, when the T-1 announcement tape leaves its origin position and causes switch CS1 to open so that the voltage at the collector of transistor Q1 of FIG. 2A is high.

When the T-2 control tone is received over the telephone line during the T-1 announcement mode, the T-1 tape is stopped, and the switch CS1 remains open, so that the T1- supply voltage remains available at the terminal 4, and at the collector of transistor Q208 and on lead V'+ for the duration of the remote control cycle. Only after the remote control cycle has been terminated, and the T-1 announcement tape has been permitted to proceed back to its origin position, will the switch CS1 again be closed to remove the T-1 supply voltage from the terminal 4, and from the lead V'+.

The microswitch MS-1 in FIG. 3A is also connected to the lead V'+ through a 2.2 kilo-ohm resistor R240, and the collector of the transistor Q210 is connected to that lead through a 33 kilo-ohm resistor R243. The junction of capacitor C219 and resistor R242 is connected to a 2.2 kilo-ohm grounded resistor R241. The emitter of transistor Q210 is grounded, and its collector is further connected to the junction of a grounded 47 kilo-ohm resistor R244, a grounded 470 microfarad capacitor C20, and a 470 ohm resistor R245. The latter resistor is connected to the base of a transistor Q211. The emitter of transistor Q211 is grounded, and its collector is connected through a 470 ohm resistor R246 to the lead V'+. The collector is also connected to a 1 kilo-ohm resistor R247 and to a 560 ohm resistor R248. The resistor R247 is connected to a diode D209, and the resistor R248 is connected to the base of an NPN transistor Q213.

The base of transistor Q213 is also connected to a grounded 1 kilo-ohm resistor R252 and to the collector of an NPN transistor Q212. The emitter of transistor Q212 is grounded, and its base is connected to the junction of a 1 kilo-ohm grounded resistor R250 and a 3.3 kilo-ohm resistor R249. The latter resistor is connected to a diode D208 and to a 3.3 kilo-ohm resistor R251. The resistor R251 is connected to the junction of a 1 kilo-ohm resistor R253 and 100 microfarad grounded capacitor C221. The resistor R253 is connected to the lead V'+. The diode D208 is connected to a diode D210 by a common cathode connection, the cathodes of the two diodes being connected to the collector of transistor Q213 and to the terminal 2 of the circuit of FIG. 2.

The diode D209 is connected through a 10 kilo-ohm resistor R254 to the base of a transistor Q214. The resistor R254 is also connected to a grounded 270 microfarad capacitor C222, and the base is connected to a grounded 10 kilo-ohm resistor R255. The emitter of transistor Q214 is grounded, and its collector is connected to a 3.3 kilo-ohm resistor R256 and to the base of a transistor Q215. The emitter of transistor Q215 is grounded, and its collector is connected through a 1.5 kilo-ohm resistor R258 and through a 33 kilo-ohm resistor R257 to the lead V'+. The diode D210 is connected to the junction of resistors R258 and R257.

The collector of transistor Q215 is also connected to the base of an NPN transistor Q216. The base of transistor Q216 is also connected to a grounded 4.7 kilo-ohm resistor R259, the collector is connected through a 470 ohm resistor R261 to the V'+ lead, and the emitter is connected to a grounded 1 kilo-ohm resistor R260. The emitter of transistor Q216 is also connected to the emitter of an NPN transistor Q217. The emitter of the latter transistor is grounded, and its collector is connected back to the terminal of the circuit of FIG. 2.

The V'+ lead is also connected through a diode D11 and through a 212 kilo-ohm resistor R262 to the base of an NPN transistor Q218. The base is also connected to a grounded 2,2 kilo-ohm resistor R263, and the collector is connected through a relay K201 to the positive terminal V+$_{cc}$. The relay K201 is shunted by a diode D212. Whenever the T-1 supply voltage to lead V'+ occurs, that is, for the duration of the T-2 remote control cycle, the transistor Q212 is conductive to energize the relay K201 which, in turn, causes the relay contacts K201A and K201B of FIG. 2 to move from their illustrated positions, and close on their normally open contacts.

Therefore, when the T-2 proper tone signal is first received at terminal 3 of the circuit of FIG. 3A during the T-1 announcement mode, the transistor Q213 will be immediately rendered conductive by the resulting current flow through resistors R246 and R248 to the base of the transistor, as the terminal 4 and lead V'+ assume a substantial positive value. When the transistor Q213 is conductive, the rewind terminal R of switch section 14A in the circuit of FIG. 2A is grounded, due to the connection from the collector of the transistor through terminal 2 of the circuit of FIG. 2A. This immediately places the system in the rewind mode, and the message tape T-2 begins rewinding back to its origin position. During the remotely controlled rewind operation, The T-1 announcement mode is inhibited due to the clamping action of diode D3, since the cathode of diode D3 is connected to the now grounded terminal 2 of the circuit of FIG. 2A. This causes the T-1 announcement tape immediately to stop; and the switch CS1 to remain in its open position, so that the voltage of the lead V'+ remains at a relatively high positive value.

As the T-2 message tape rewinds during the remotely controlled rewind operation, the message tape feed spindle repeatedly opens and closes the switch MS-1, causing the switch to deliver a pulse train to the base of the transistor Q210 cyclically to render the transistor conductive and non-conductive. Each time the transistor Q210 is rendered conductive, the capacitor C220 is discharged and, as long as capacitor C220 remains discharged, the transistor Q211 will remain in a non-conductive state and the remotely controlled rewind operation will continue. The repetition requency of the pulses from the microswitch MS-1 is sufficiently high so that as long as the pulses continue, the capacitor C220 will be discharged to a level insufficient to render the transistor Q211 conductive.

When the T-2 message tape has been rewound to its origin position, the feed spindle will stop, and the pulse train introduced to the base of transistor Q210 by microswitch MS-1 will be terminated. Capacitor C220 will now begin to charge by way of resistor R243 and, in time, the charge will rise to a sufficient level to render the transistor Q211 conductive. When the transistor Q211 is conductive, it causes the transistor Q213 to become non-conductive so as to terminate the rewind operation. At this time, the transistor Q212 becomes conductive, and it remains conductive throughout the duration of the remote control cycle to hold the transistor Q213 in its non-conductive state and thereby to prevent any further rewind operation. When the transistor Q213 is first rendered conductive, the resulting clamping action of the diode D208 holds the transistor Q212 non-conductive. However, when the transistor Q213 is rendered non-conductive, the clamping action of the diode D208 is no longer effective, so that the transistor Q212 becomes conductive, and remains in its conductive state for the duration of the remote control cycle.

When the transistor Q213 is rendered non-conductive, the clamping action of the diode D210 is also removed allowing transistors Q216 and Q217 to be rendered conductive by way of the resistors R257 and R258. The collector of the transistor Q217 is connected to terminal 1 of the circuit of FIG. 2A, which, in turn, is connected to the playback contact (P) of switch section 14A, so that the forward playback operation of the T-2 message tape is initiated. When the transistor Q213 is rendered non-conductive, the clamping action of the diode D6 in the circuit of FIG. 2A is removed. However, the movement of the T-1 announcement tape continues to be inhibited during the playback operation due to the clamping action of diode D7 which is connected to the terminal 1 of the circuit.

During the remotely controlled T-2 playback operation, all the messages previously recorded on the T-2 message tape are sent to the calling party over the telephone line. This playback operation will continue until a second T-2 remote signal is received, or in the event the T-2 message tape stops turning should the T-2 message tape be allowed to run to the end of its travel. Should the T-2 message tape come to the end of its travel before a second remote signal is received, pulses from the microswitch MS-1 will again stop, and capacitor C220 will again charge to render the transistor Q211 conductive.

When the transistor Q211 is rendered conductive, the charging path of capacitor C222 through resistor R247 and diode D209 will be removed, and the capacitor will start to discharge. When the capacitor C222 discharges sufficiently, the transistor Q214 will be rendered non-conductive. When that occurs, the transistor Q215 is rendered conductive which, in turn, inhibits the conductivity of the transistors Q216 and Q217. When the transistor Q217 is rendered non-conductive, the playback mode of the T-2 message tape will be stopped, and the clamping action of the diode D7 will be no longer available. When that occurs, the T-1 mode is allowed to continue until the announcement tape again closes the switch CS-1 of FIG. 2A to remove the voltage from terminal 4, so that the voltage lead V'+ drops to zero, thereby de-activating remote control circuit of FIGS. 3A and 3B, as the silicon controlled rectifier SCR201, and therefore the transistor Q208 will be rendered non-conductive.

On the other hand, should a second T-2 control signal be received before the T-2 message tape reaches the end of its travel, the transistor Q207 in the Schmitt trigger will become non-conductive so as to render the transistor Q209 conductive which, in turn, short-circuits the charged capacitors C215 and C216 to ground, driving the anode of the silicon controlled rectifier SCR201 below ground potential which turns off the silicon controlled rectifier, and thereby terminates the T-2 remote cycle. The clamping action of diode D7 in the circuit of FIG. 2 is now removed, so that the T-1 announcement tape is activated and moves to its origin position at which the switch CS1 is closed, thereby de-activating the T-2 remote control circuit of FIG. 3.

As mentioned briefly above, the T-1 supply voltage from terminal 4 of the circuit of FIG. 2B is used to render the transistor Q218 conductive, so that the relay K201 is energized throughout the T-2 remote cycle. This causes the erase head EH-2 to be de-energized during the remote cycle as the relay contacts K201B are opened, and it also connects the record-playback head RPH-2 into the proper circuit so that the signals recorded on the message tape may be played back and transmitted through the audio amplifier integrated circuit IC-2 to the telephone line, regardless of the position of switch sections 14C and 14D.

The diode D212 is a transient suppressor for the coil of the relay K201, and is used to protect the transistor Q218. the relay contacts K201A, when actuated, switch the record/playback head RPH-2 associated with the T-2 message tape to the input of the audio amplifier integrated circuit IC-2. The relay contacts K201B, when actuated, remove the ground of the erase head EH-2 associated with the T-2 message tape, so that the message tape will not be erased during the remote operation.

A tape end release is provided to permit the remote operator to return the message tape T-2 to its origin position in the event the T-2 tape should come to the end of its travel before the second remote signal is received which would normally stop the tape. Should that occur, the pulses from the microswitch MS-1 would stop, and capacitor C220 would charge rendering the transistor Q211 conductive. When transistor Q211 is conductive, the charging path of capacitor C222 through a resistor R247 and diode D209 is removed, so that capacitor C222 discharges to a point at which transistor Q214 is rendered non-conductive, and transistor Q215 becomes conductive inhibiting the operation of transistors Q216 and Q217. When the transistor Q217 is non-conductive, the T-2 playback mode will be terminated and the clamping action of diode D7 is no longer available. Then the system returns to the T-1 mode, and the T-1 announcement tape is permitted to continue to the end of its cycle. At that time the T-1 voltage will be removed from terminal 4 of FIG. 3B. The remote cycle will then be ended as SCR201 and, therefore, transistor Q208 will become non-conductive. The system is now responsive to a subsequent tone from the remote operator to return the message tape to its origin position.

The invention provides, therefore, a simplified system for controlling a telephone answering mechanism, and which responds to a tone of a predetermined frequency to cause the telephone answering mechanism to play back all existing messages to the remote caller.

While a particular embodiment of the invention has been shown and described, modifications may be made. It is intended in the claims to cover the modifications which come within the spirit and scope of the invention.

What is claimed is:

1. In a telephone answering system for responding to telephone messages received over a telephone line and which includes a first magnetic tape mechanism having a recorded announcement thereon which is transmitted over the telephone line during a time interval $T_1$ in response to a telephone call, a switching means coupled to said first magnetic tape mechanism to be activated to a particular state for the duration of the $T_1$ time interval, and a second magnetic tape mechanism for recording messages received over the telephone line during a second time interval $T_2$ following the time interval $T_1$; the combination of: a tone sensing circuit coupled to the telephone line for sensing a tone signal of a predetermined frequency received over the telephone line and for providing an output signal in response thereto; a first control circuit connected to the switching means and to the tone sensing circuit and responsive to said output signal produced during the $T_1$ time interval and when said switching means is actuated to said particular state for causing the first magnetic tape mechanism to stop and for causing the second magnetic tape mechanism to rewind to a reference position; pulse generating means coupled to the second magnetic tape mechanism for producing pulses during movement of the second magnetic tape mechanism; a second control circuit coupled to the pulse generating means and responsive to the termination of the pulses therefrom to cause the second magnetic tape mechanism to move forward and to transmit the messages recorded thereon over the telephone line; and a third control circuit connected to the tone sensing circuit and responsive to an output signal therefrom corresponding to a second tone signal of said predetermined frequency received over the telephone line for stopping the forward motion of said second magnetic tape mechanism and for restarting said first magnetic tape mechanism so as to cause said first magnetic tape mechanism to complete the $T_1$ time interval.

2. The combination defined in claim 1, in which said pulse generating means comprises a switch mechanically coupled to the second magnetic tape mechanism which opens and closes and thereby generates a pulse train as said second tape mechanism rewinds.

3. The combination defined in claim 1, and which includes a fourth control circuit coupled to the pulse generating means and responsive to pulses therefrom during the forward motion of the second magnetic tape mechanism to restart the first magnetic tape mechanism so as to complete the $T_1$ time interval upon the termination of said pulse when said second tape mechanism reaches the end of its travel.

* * * * *